W. B. LE BOURGEOIS.
ANTIRATTLING DEVICE.
APPLICATION FILED FEB. 24, 1919.
1,314,001.
Patented Aug. 26, 1919.
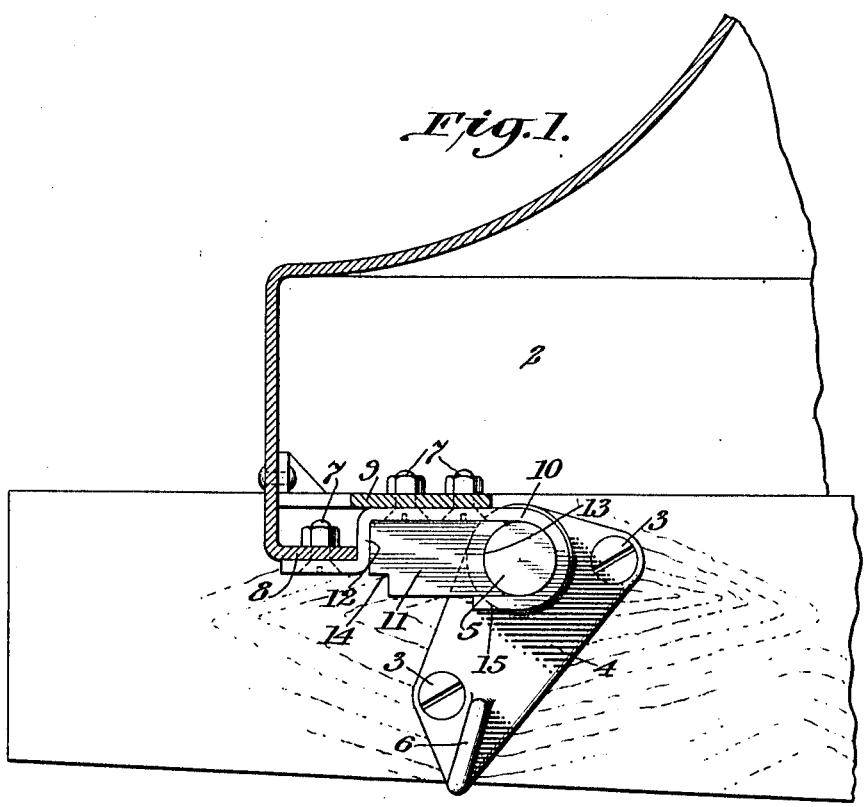
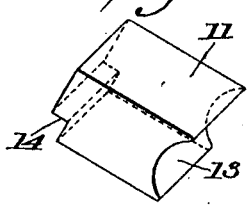
Inventor
William B. Le Bourgeois
By Pearce & Phelps
Attorneys

UNITED STATES PATENT OFFICE.

WILLIAM B. LE BOURGEOIS, OF NEW ORLEANS, LOUISIANA.

ANTIRATTLING DEVICE.

1,314,001.  Specification of Letters Patent.  Patented Aug. 26, 1919.

Application filed February 24, 1919. Serial No. 278,843.

*To all whom it may concern:*

Be it known that I, WILLIAM B. LE BOURGEOIS, a citizen of the United States, residing at New Orleans, in the parish of Orleans and State of Louisiana, have invented certain new and useful Improvements in Antirattling Devices, of which the following is a specification.

The object of this invention is to provide a simple and inexpensive device for use with bearings, and it is adapted particularly to the bearings of the type used to support the front end of the engine bonnet or hood of a "Franklin" automobile, for the purpose of preventing disengagement and rattling of the members of such bearings.

The invention consists of a block of fiber, wood, or other suitable material so shaped as to fit snugly between the members of the bearing and, though preventing disengagement of same, interfering in no way with the proper pivotal functioning of the bearing, as I will proceed now to explain and finally claim.

In the accompanying drawings illustrating the invention, in the several figures of which like parts are similarly designated, Figure 1 is a sectional elevation of a portion of the front end of a "Franklin" automobile showing the bearing provided with the device of the invention. Fig. 2 is a perspective view of the device. Fig. 3 is a perspective view of a modified form of the device.

1 designates a portion of one of the side frame-members of a "Franklin" automobile; 2 designates a portion of the engine-bonnet or hood.

Secured to the member 1 by bolts or screws 3 or the like is a bracket 4 provided with a trunnion 5 and outwardly projecting stop-member 6.

Secured to the bonnet 2 by bolts 7 or the like, coacting with the inturned lip 8 of the front end of the bonnet and with a corner plate 9, is a hook member 10 which coacts with the trunnion 5 to form the bearing for the front end of the bonnet 2.

When it is desired to inspect the engine the rear end of the bonnet is raised and the bonnet pivots on the bearing formed by trunnion 5 and hook member 10, the pivotal movement of the bonnet being limited by engagement of lip 8, and the part of the hook member 10 attached thereto, with stop-member 6 which projects into its path of movement. When it is desired to completely remove the bonnet from the automobile, the bonnet is swung to the position above described and is then lifted bodily to disengage the hook-member 10 from the trunnion 5.

In operation of an automobile, having the features set forth, over rough roads, it has been found that the shocks and jars incident thereto sometimes cause the members of the bearing to rattle and even become completely disengaged, and to remedy this trouble I provide a block 11 of fiber, wood, or other suitable, slightly compressible material adapted to fit snugly between the trunnion 5 and a shoulder 2 of the hook-member, and having a grooved face 13 of such curvature as to conform to the surface of the trunnion, the opposite end of the block being provided with a cut-out portion or jog 14 to coact with the stop member 6 and to prevent interference with the raising of the bonnet to complete open position. This block is made of such dimensions that it will be held in position by friction but it is afforded additional vertical support by engagement with the free end 15 of the hook-member 10.

It will therefore be evident by reference to Fig. 1 that any longitudinal movement of the bonnet 2 and hook member 10 relative to the trunnion 5 is impossible with my block applied, but the pivotal movement of the bonnet about the trunnion and the operation of the stop member are in no way interfered with.

If it is desired to remove the bonnet completely, the block may be readily removed, and it may be as readily replaced when the bonnet is replaced.

In the modified form of the invention shown in Fig. 3, the body of the block may be made of harder material than fiber or wood, such as iron or steel, or it may be of fiber or wood or other material, and provided with a friction member 16 of rubber, leather or the like compressible material, attached to the body of the block by screws or other suitable fastenings.

With the use of either form of the invention the chance of disengagement of the members of the bearing and even of rattling thereof will be eliminated.

Various changes in form and material to suit various uses to which the invention may be put are to be understood as contemplated within the spirit of the invention and the scope of the appended claims.

What I claim is:

1. The combination with a bearing having a trunnion member and a member coacting therewith and movable relatively thereto, of a bearing-block interposed between said trunnion member and said relatively movable member to prevent relative movement therebetween.

2. The combination with a bearing having a trunnion member and a member coacting therewith and movable longitudinally relatively thereto, of a bearing block interposed between said trunnion member and said longitudinally movable member to prevent relative longitudinal movement therebetween.

3. The combination with a bearing having a trunnion member and a hook member coacting therewith and provided with a shoulder, of a bearing block interposed between said trunnion member and the shoulder of said hook-member to prevent disengagement of said members.

4. The combination with a bearing having a trunnion member stationarily mounted and a hook-member movably mounted and provided with a shoulder, of a bearing block formed of relatively compressible material interposed between said trunnion member and the shoulder of said hook-member and frictionally held therebetween to prevent relative longitudinal movement between said members.

5. The combination with a bearing having a trunnion mounted upon a stationary member and a hook-member coacting therewith and provided with a shoulder and mounted upon a relatively movable member, and a stop member adjacent said trunnion for limiting the movement of said movable member, of a bearing block frictionally interposed between said trunnion and the shoulder of said hook-member and having one face curved to conform to the curvature of said trunnion and its opposite face shaped to coact with said shouldered hook-member and provided with a jog to coact with said stop member, for the purpose specified.

6. In a motor vehicle having a journaled bonnet, the combination with the journal of said bonnet comprising a trunnion-member mounted upon the frame of the vehicle and a hook-member coacting therewith and mounted upon said bonnet and having its free end extended past said trunnion, of a bearing-block interposed between said trunnion and said hook-member and engaging the free end of the latter, whereby longitudinal movement of said bonnet with respect to the vehicle frame is prevented as specified.

In testimony whereof I affix my signature in presence of two witnesses.

WILLIAM B. LE BOURGEOIS.

Witnesses:
ARTHUR R. PIRTAS,
J. N. SWING.

Copies of this patent may be obtained for five cents each, by addressing the "Commissioner of Patents, Washington, D. C."